(12) United States Patent
Cameron et al.

(10) Patent No.: US 8,175,842 B2
(45) Date of Patent: May 8, 2012

(54) METHOD AND SYSTEM FOR MEASURING A COMPONENT

(75) Inventors: Mitchel Cameron, Johnstone (GB); Hang W Lung, Derby (GB); Nicholas B Orchard, Bristol (GB); Michael J S Gooder, Telford (GB)

(73) Assignee: Rolls-Royce PLC, London (GB)

( * ) Notice: Subject to any disclaimer, the term of this patent is extended or adjusted under 35 U.S.C. 154(b) by 477 days.

(21) Appl. No.: 12/227,972

(22) PCT Filed: Jun. 14, 2007

(86) PCT No.: PCT/GB2007/002226
§ 371 (c)(1),
(2), (4) Date: Jul. 15, 2009

(87) PCT Pub. No.: WO2008/001043
PCT Pub. Date: Jan. 3, 2008

(65) Prior Publication Data
US 2009/0306930 A1    Dec. 10, 2009

(30) Foreign Application Priority Data
Jun. 29, 2006 (GB) .................................. 0612925.8

(51) Int. Cl.
*G01B 21/20* (2006.01)
*G01B 5/20* (2006.01)
(52) U.S. Cl. .......................................... 702/167; 33/546
(58) Field of Classification Search .................. 702/167; 356/376; 33/546
See application file for complete search history.

(56) References Cited

U.S. PATENT DOCUMENTS

| 4,531,837 | A * | 7/1985 | Panetti ........................ 356/608 |
| 6,175,415 | B1 | 1/2001 | Pietrzak et al. |
| 2005/0106998 | A1 | 5/2005 | Lin et al. |
| 2005/0165578 | A1 | 7/2005 | Gorsch et al. |
| 2006/0020432 | A1 | 1/2006 | Gower |

FOREIGN PATENT DOCUMENTS
EP    1 615 153 A2    1/2006
* cited by examiner

*Primary Examiner* — Bryan Bui
(74) *Attorney, Agent, or Firm* — Oliff & Berridge, PLC

(57) ABSTRACT

A method for measuring the profile of a component in the region of an edge of the component comprises the following steps: determining the position of an edge point of the component; defining a center line for the component in the region of the edge; and measuring at least one dimension of the component with reference to the center line.

14 Claims, 5 Drawing Sheets

METHOD AND SYSTEM FOR MEASURING A COMPONENT

BACKGROUND

This invention relates to the measurement of the surface profiles of components. More particularly, it relates to the measurement of aerofoil blades of a gas turbine engine.

In a gas turbine engine, each of the rotor blades and stator vanes is of aerofoil cross-section shape and must conform with its intended design, within certain limits of acceptability. For example, each aerofoil has a leading edge designed with a complex geometry to deliver a specific effect. Deviations from the optimum design may result in undesirable reductions in performance, such as aerodynamic stall, compressor surge or reduction in engine efficiency. In some circumstances, relatively small deviations may have significant effects on performance.

The assessment of conformity of aerofoil edges is conventionally done by comparing a set of measured data points to the nominal design profile requirements. The design profile has a tolerance band within which the data points must lie in order for the blade to be deemed acceptable. The tolerance band can take a number of forms—unilateral, bilateral, constant width, variable width, etc. The assessment of form is independent of the assessment of edge position, so it is normal practice to do some form of best fitting of the measured data to the nominal data before making the assessment. The standard method of best fitting is the least-squares error method, and following the best fit all the points of the measured contour must lie within the tolerance band in order for the blade to be acceptable. European patent application EP1615153A2 describes one such assessment method.

This method of assessment does not take full account of the relative importance of the region of the aerofoil near to the edge in comparison to the regions further away. This is particularly important when the edge profile is not designed to be circular, for example when it is elliptical. The least-squares method is also limited when the blade is measured part way through manufacture, and has material which is yet to be removed, or where the blade shape will change due to the manufacturing process. Additionally, comparison of a full-form profile with the tolerance bands is time-consuming.

Conformity may alternatively be assessed using mechanical measuring devices such as go/no-go gauges, but these can damage the surfaces they are designed to measure.

SUMMARY OF THE INVENTION

It is an object of this invention to provide a method and system for measuring a component that substantially overcomes the disadvantages of known methods.

According to the invention, there is provided a method and a system of measuring the profile of a component in the region of an edge of the component in accordance with the independent claims.

BRIEF DESCRIPTION OF THE DRAWINGS

Embodiments of the invention will now be described, by way of example, with reference to the accompanying drawings in which.

DETAILED DESCRIPTION

Figure 1:
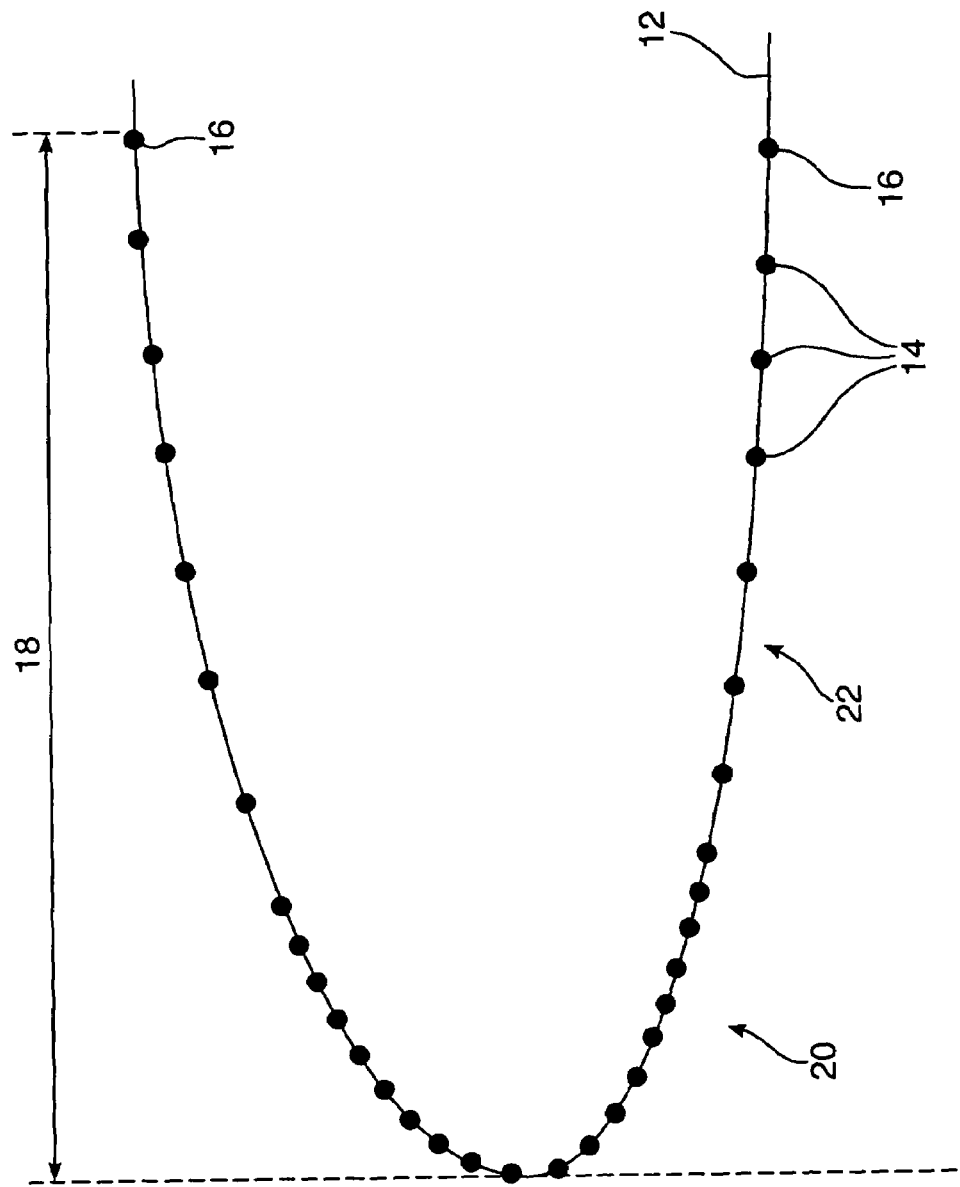
FIG. 1 is a plan view of part of a section through a blade, showing the leading edge.

The invention uses a novel method of determining the leading edge point of the blade, aligning the measured part of the edge, and then assessing the edge thickness and offset at a number of positions along the blade.

Note that for ease of representation, blade centre lines are shown as straight lines in the drawings. In a real, curved aerofoil blade, the blade centre line will be curved. Also, the two sides of the blade are shown as symmetrical—this is not usually the case.

Referring first to FIG. 1, the leading edge 12 of a gas turbine intermediate pressure compressor blade is digitised by measuring a series of points 14 from one side of the blade to the other, ensuring that the end points 16 are sufficiently well clear of the area of interest, say 6-7 mm back from the edge (dimension 18). The spacing between points needs to be appropriate to the local curvature of the blade, with a smaller spacing around the edge (20) than on the flatter parts further back (22). In this example, for a physically small blade, the first 2 mm nearest the leading edge (the "measurement zone") is measured using a 0.004 mm spacing, and the rest of the form (the "centre line correction zone") is measured using a 0.030 mm spacing. Any convenient method of measurement may be used, contact or non-contact, such as co-ordinate measuring machine (CMM), laser triangulation, in-process probe, etc.

Figure 2:
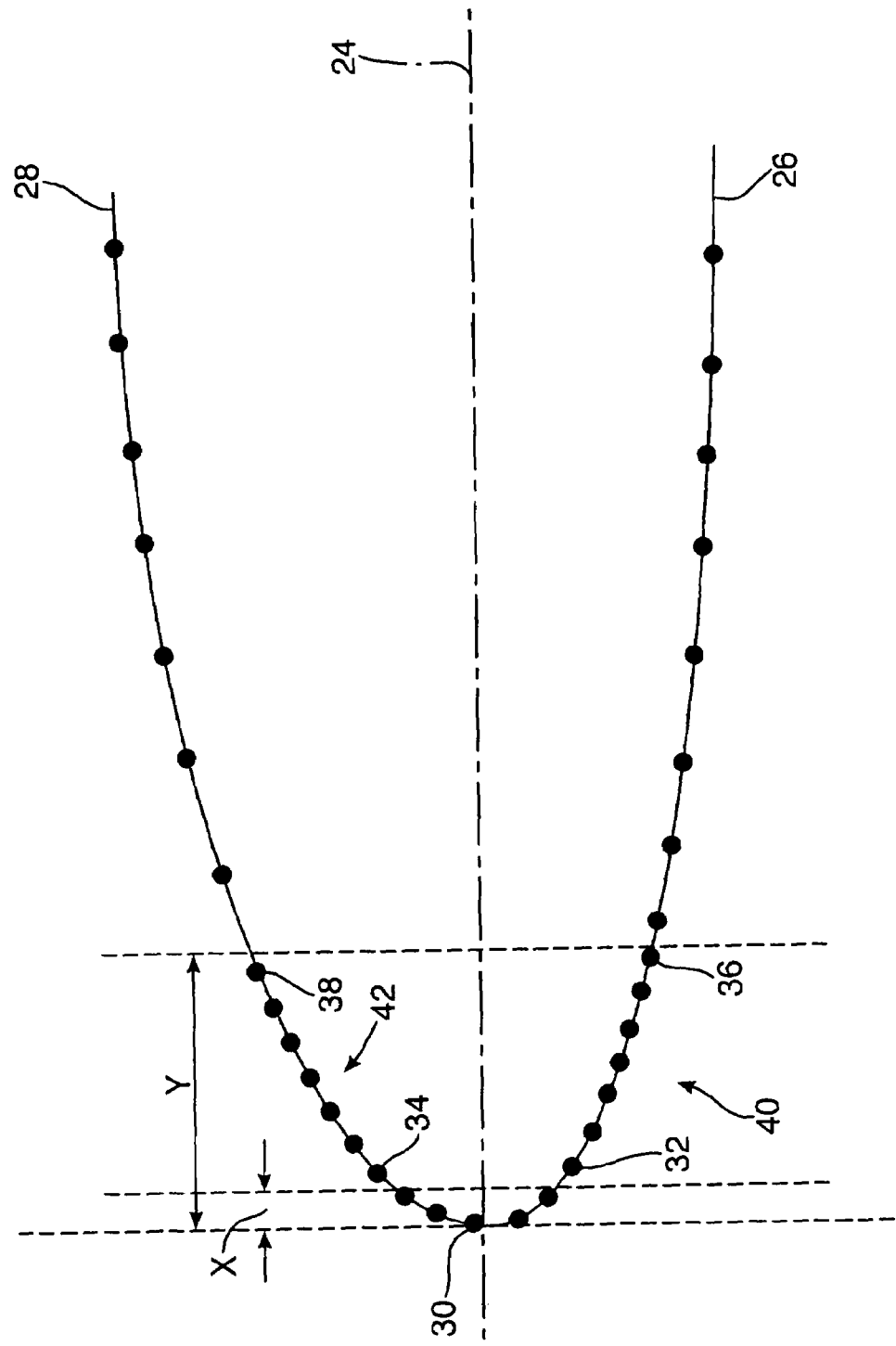
FIG. 2 is a similar plan view, showing how data points are selected.

Referring now to FIG. 2, the first step in the data analysis is to establish the effective tip location. The effective tip location is a virtual position—it may or may not be one of the measured points depending on the stage of manufacture, and it may fall within or outside the material of the blade. Starting with an approximate edge centre line 24, the edge profile is divided into two parts, a concave 26 and a convex 28 part (these corresponding to the concave and convex surfaces of the blade). A subset of the measured data points in each part is then defined. First, the extreme measured point 30 is identified. The first point in each part 26, 28 at least a certain distance X back from the extreme point 30 is then identified—these points 32, 34 are the first points in each subset. A second distance Y from the extreme point 30 is defined, and the last measured point 36, 38 in each part forms the last point in each subset. In this example, X is, 0.1 mm and Y is 0.8 mm. There are now defined two subsets of measured points 40, 42, respectively associated with the concave 26 and convex 28 parts.

Figure 3:
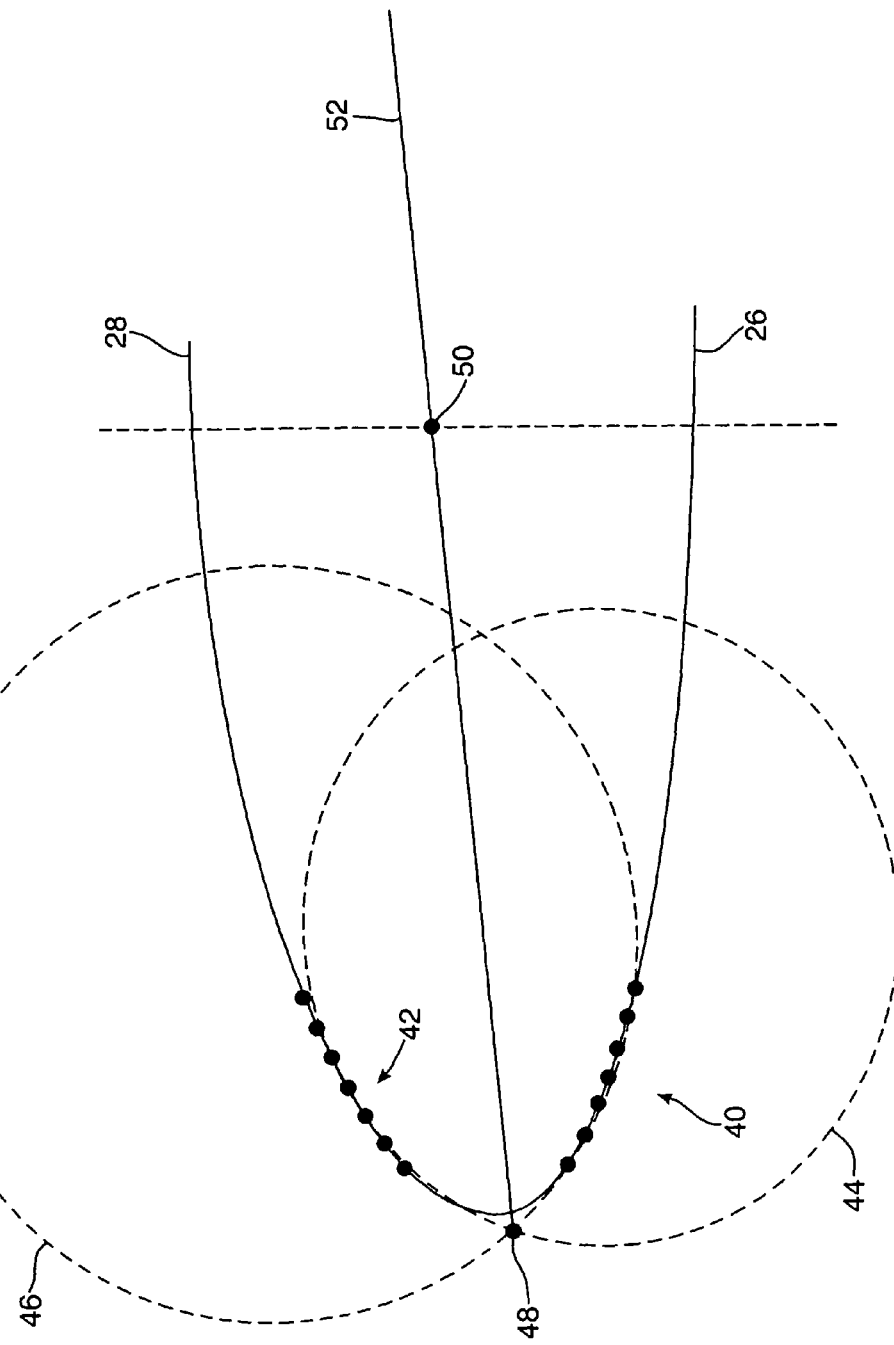
FIG. 3 is a similar plan view, showing how the leading edge point is determined.
Figure 4:
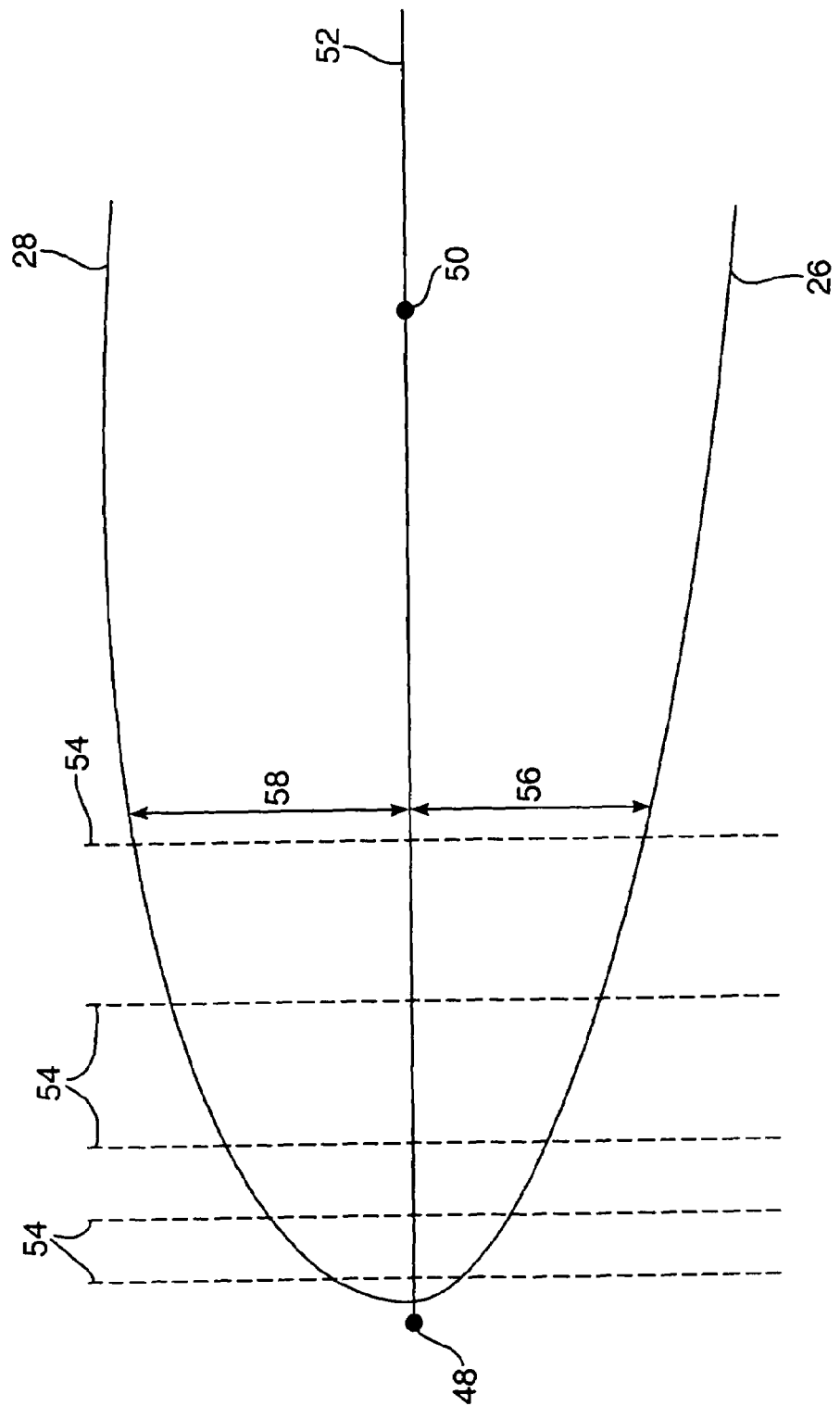
FIG. 4 is a similar plan view, showing positions for measurement of thickness and offset.

Referring now to FIG. 3, a least-squares best-fit circle 44 is fitted to subset 40 and a least-squares best-fit circle 46 (which may have a different radius from circle 44) is fitted to subset 42. The intersection point 48 of the two circles 44, 46 is taken as the true blade tip or leading edge point.

Having found the blade tip it is then possible to determine the true blade centre line. The midpoint 50 of the blade at a reasonable distance back from the tip, say 6 mm, can be determined, and then the centre line is defined by a straight line 52 joining the midpoint 50 to the leading edge point 48.

With the blade aligned along its centre line 52, the edge thickness can then be determined at any number of positions back from the tip by intersecting the blade contour with lines 54 perpendicular to the blade centre line. These lines are set at positions that are determined by the relative importance of the parts of the profile. For example the lines will be closer together near the tip, spreading apart as the lines move away from the tip. In this example, thicknesses are computed at 0.180 mm, 0.380 mm, 0.580 mm, 1.080 mm and 1.580 mm from the blade tip.

In addition, the distances 56, 58 from the blade centre line respectively to the concave 26 and convex 28 sides may be measured, thus giving a measure of the blade symmetry and edge offset. In this example, these distances are computed at 0.180 mm, 0.380 mm and 0.580 mm from the blade tip. Although in this simplified example the distances 56, 58 are substantially equal, in an alternative embodiment where the profiles 26, 28 are different (where there is an offset, or a virtual centre line) the distances 56, 58 will likewise be different.

Figure 5:
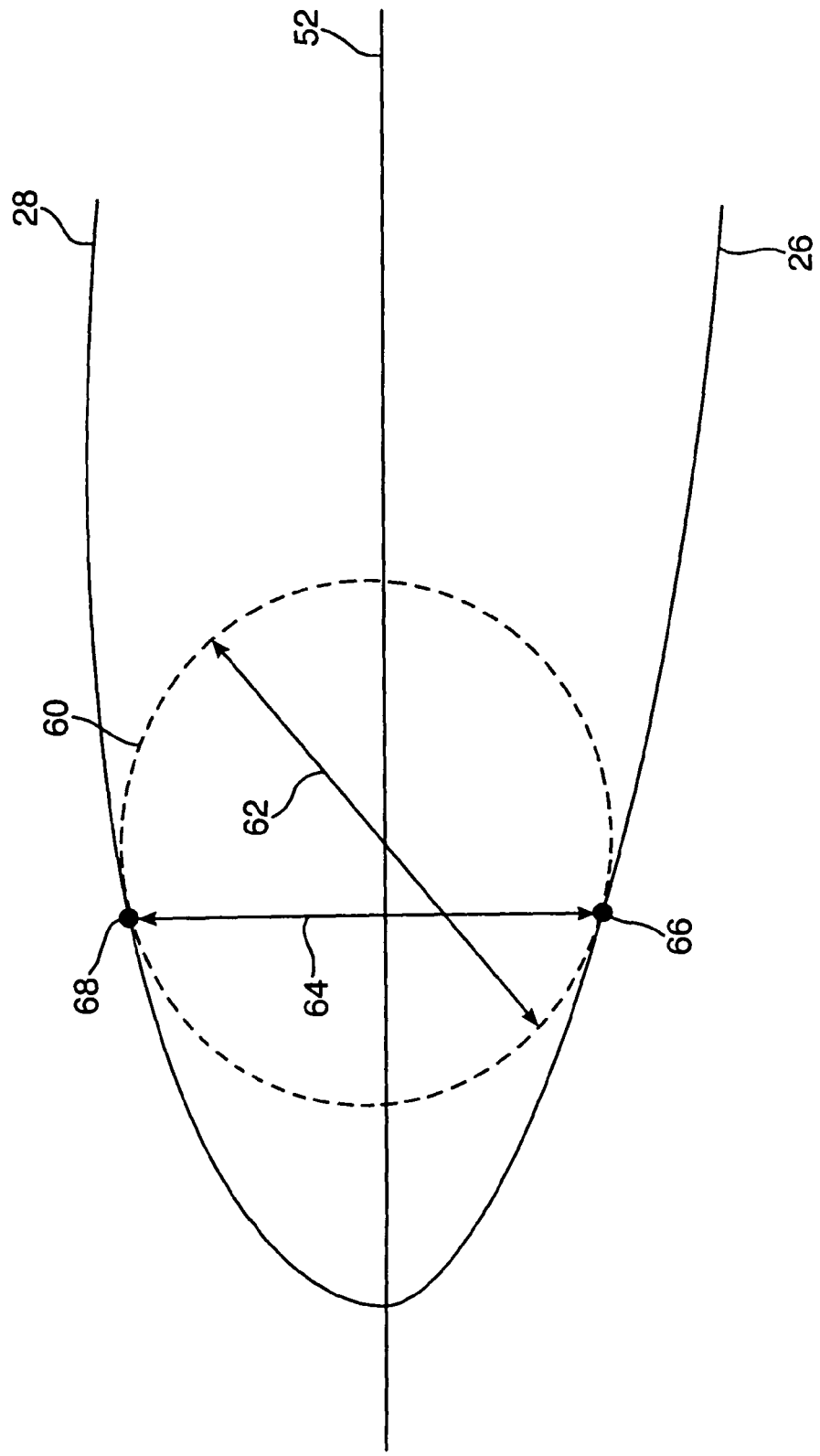
FIG. 5 is a similar plan view, showing alternative ways to define the blade thickness.

Alternative methods of calculating the thickness are shown in FIG. 5. The first step is to determine the largest circle 60 that will fit inside the edge profile 26, 28 at a given position on the centre line 52. The thickness can then be defined either as the circle diameter 62, or as the distance 64 between the two tangent points 66, 68.

By comparing the measured thicknesses and offsets with the design requirements it is possible to determine the acceptability of the edge form and what processing, if any, is needed to produce an acceptable blade.

It will be appreciated that the profile may be different at different heights along the blade.

Additionally, the ellipse ratio may be calculated for each of the top and bottom surfaces. The ellipse ratio describes the shape of the surface and can be used to control an adaptive machine cell to produce a similar shape. Where the ellipses on the two surfaces differ, a virtual centre line to the blade is determined and used to 'correct' or 'offset' the measurement calculations.

A skilled person will appreciate that modifications may be made to the method set out in this description, or alternatives employed, without departing from the spirit and scope of the invention.

The method could equally well be used to measure the profile of a trailing edge of a blade or vane, or could be used to measure any similarly-shaped profile in any aerofoil or hydrofoil or similarly-shaped component. Some particular examples of such components are marine propellers, propulsors and propulsive static vanes; and helicopter blades.

Dimensions will vary according to the particular profile of the component, and according to its size. For example, the dimension 18 may be 12-15 mm for larger gas turbine blades, and perhaps 30-40 mm for marine propeller blades.

The ellipses on the two surfaces may be similar to each other, or may be different.

Alternative methods of finding the tip point could include: fitting fixed radius circles to the data instead of finding the best-fit circles; curve fitting a closed distance from the edge (i.e. at one or more fixed points from the edge); fitting a shape that is more closely matched to the design shape, for example an ellipse; using a curve fit with increasingly fine point selection as the tip is approached.

If the blade has complex curvature (for example, if it is a swept blade) then the fitted curve may not lie within the two dimensions considered in the specific embodiment (and illustrated in the drawings), but may extend in three dimensions. In this case, the curve would be a great circle path on a sphere or ellipsoid.

Alternative methods of setting the blade centre line could include: joining the mid points at two positions along the blade, one close to the edge and one further back; creating a curved centre line instead of straight, by calculating the mean line between the convex and concave sides of the blade (this could be useful when the blade has significant curvature at the edge).

As the initial position of the blade is only an estimate, a more accurate centre line could be found by iterating the process until no change is found in consecutive alignments.

The process can be repeated, as required, at several points along the length of the blade. The profile and ellipse ratios may vary along the length of the blade.

The key advantage of this invention is that the assessment of a blade edge can be tuned to suit the specific geometry of the design. A second advantage is that the assessment can be carried out more quickly than a full profile assessment because of the reduction in the number of actual to nominal comparisons needed. The assessment is not significantly affected by small perturbations in the surface contour at the extremity of the edge, whether these are introduced by the measurement system, or whether they are due to the blade being part-finished.

The method can be used in the design process, to provide a definition of the blade profile (based upon an assessment of a "virtual" blade within a CAD tool) which can be used in stress or other calculations. It can be used during the manufacturing process, to measure a real blade's profile and define processing requirements or acceptability. Because the profile definition is based on relatively few measured points it is quicker and easier to calculate than a definition based on, say, a FE mesh. The same method can also be used to assess service run blades to measure both their current profile and calculate whether sufficient material margin exists to dress the edge or whether repair (possibly including material addition) is required prior to reshaping.

Because a consistent method is used in the design, manufacture and rework phases, and because the method may be used both in CAD and in CAM systems, a closer correlation is possible between the design intent and what is actually manufactured.

The invention claimed is:

1. A method for measuring the profile of a component in the region of an edge of the component, the method comprising the following steps:
   a) determining the position of an edge point of the component, wherein step a) comprises:
      aa) measuring the periphery of the component in the region of the edge;
      ab) producing two co-ordinate datasets from the measurements, one dataset being produced from the measurements falling to one side of the edge and the other dataset being produced from the measurements falling to the other side of the edge;
      ac) fitting a best-fit curve to each co-ordinate dataset;
      ad) determining the intersection point of the two curves;
      ae) defining this intersection point to be the edge point;
   b) defining a centre line for the component in the region of the edge; and
   c) measuring at least one dimension of the component with reference to the centre line.

2. The method as in claim 1, in which in step b) the centre line is defined with an offset.

3. The method as in claim 1, in which in step ac) each curve is selected from the list consisting of: circle, ellipse, great circle path on sphere, great circle path on ellipsoid.

4. The method as in claim 1, in which the spacing of successive measurements depends on the local curvature of the periphery of the component.

5. The method as in claim 4, in which the spacing is smaller where the curvature is greater.

6. The method as in claim 1, in which step ab) includes the further steps of:
a) defining lower and upper limiting values;
b) excluding from the datasets those points outside the limiting values.

7. The method as in claim 1, in which step b) comprises the following steps:
ba) determining the mid-point of the component at a predetermined distance away from the edge;
bb) defining a straight line joining the edge point and the mid-point;
bc) defining the straight line to be the centre line of the component.

8. The method as in claim 1, in which in step c) the thickness of the component is measured along a line perpendicular to the centre line.

9. The method as in claim 1, in which in step c) the distances from the centre line to the respective two surfaces of the component, along a line perpendicular to the centre line, are measured and compared, to provide an indication of the symmetry of the component.

10. The method according to claim 1, and further comprising the following step:
d) comparing the measured dimension or dimensions with design values to determine whether the profile meets predetermined criteria of acceptability.

11. The method according to claim 1, and further comprising the following step:
e) in a service-worn component, determining whether sufficient material remains to re-work the component and, if not, calculating the required position and level of material deposition or repair.

12. The method according to claim 1, in which the component is an aerofoil or hydrofoil.

13. The method according to claim 1, in which the component is a compressor blade for a gas turbine engine and the profile is to be measured in the region of the leading edge of the blade.

14. The method according to claim 1, in which the component is an object within a computer-implemented design program.

* * * * *